(12) United States Patent
Greve, III et al.

(10) Patent No.: US 12,471,230 B2
(45) Date of Patent: Nov. 11, 2025

(54) ISOLATING MOTOR CONTROL CENTER BYPASS UNITS AND SYSTEMS

(71) Applicant: Eaton Intelligent Power Limited, Dublin (IE)

(72) Inventors: Robert W. Greve, III, Harleysville, PA (US); Shriram Jayshankar Ghorpade, Solapur (IN); John A. Bordewick, Fayetteville, NC (US)

(73) Assignee: Eaton Intelligent Power Limited, Dublin (IE)

( * ) Notice: Subject to any disclaimer, the term of this patent is extended or adjusted under 35 U.S.C. 154(b) by 306 days.

(21) Appl. No.: 18/184,158

(22) Filed: Mar. 15, 2023

(65) Prior Publication Data

US 2024/0314953 A1 Sep. 19, 2024

(51) Int. Cl.
*H05K 5/02* (2006.01)
*H02B 11/26* (2006.01)
*H02H 7/093* (2006.01)
*H02K 11/30* (2016.01)

(52) U.S. Cl.
CPC ........... *H05K 5/0247* (2013.01); *H02B 11/26* (2013.01); *H02H 7/093* (2013.01); *H02K 11/30* (2016.01); *H05K 5/0217* (2013.01)

(58) Field of Classification Search
CPC .... H05K 5/0247; H05K 5/0217; H02B 11/26; H02H 7/093; H02H 7/0822; H02K 11/30

USPC ............................................. 318/558; 361/23
See application file for complete search history.

(56) References Cited

U.S. PATENT DOCUMENTS

| | | | | |
|---|---|---|---|---|
| 7,525,809 | B2 * | 4/2009 | Bergmann | H02J 13/0005 361/752 |
| 9,696,704 | B2 * | 7/2017 | Xu | G05B 19/4185 |
| 11,366,462 | B2 * | 6/2022 | Li | G01R 31/3277 |
| 11,482,911 | B2 * | 10/2022 | Morris | H02B 1/20 |
| 2020/0412123 | A1 | 12/2020 | Morris et al. | |
| 2020/0412211 | A1 | 12/2020 | Morris et al. | |

* cited by examiner

*Primary Examiner* — David Luo
(74) *Attorney, Agent, or Firm* — Stanek Lemon Crouse & Meeks, PA

(57) ABSTRACT

An apparatus includes a housing, a first disconnect switch in the housing and having a first terminal configured to be coupled to a first unit (e.g., a first VFD or RVSS) external to the housing and a second disconnect switch in the housing and having first terminal configured to be couple to a second unit (e.g., a second VFD or RVSS) external to the housing. The apparatus further includes a first contactor in the housing and having a first terminal coupled to a second terminal of the first disconnect switch and a second terminal configured to be coupled to a motor and a second contactor in the housing and having a first terminal coupled to a second terminal of the second disconnect switch and a second terminal configured to be coupled to the motor, the second contactor mechanically interlocked with the first contactor.

17 Claims, 5 Drawing Sheets

ISOLATING MOTOR CONTROL CENTER BYPASS UNITS AND SYSTEMS

BACKGROUND

The present application relates to motor control centers (MCCs) and, more particularly, for bypass units and systems for variable frequency drives (VFDs), reduced voltage soft starters (RVSSs), motor starters and other MCC units.

A typical MCC is a multi-compartment steel enclosure with a bus system to distribute electrical power from a common bus to a plurality of individual motor control units mountable within the compartments. The individual motor control center units are commonly referred to as "buckets" and are typically constructed to be removable modular units that have, or are installed behind, individual sealed doors on the motor control center enclosure. These units may contain various motor control and motor protection devices such as motor controllers, starters, contactor assemblies, overload relays, circuit breakers, motor circuit protectors, various disconnects, and similar devices for electric motors. The units connect to the common power bus of the motor control center and conduct supply power to a line side of the motor control devices for operation of motors and feeder circuits Motor control centers are often used in factories and industrial and commercial facilities that utilize high power electrical motors, pumps, and other loads.

In some MCC applications it is desirable to provide bypass capability wherein different VFDs and/or motor starters may be selectively connected to the same motor or other load to provide redundancy and/or to support different operating modes. U.S. Patent Application Publication No. 2020/0412123 to Morris et al. (assigned to the assignee of the present application) describes a bypass unit for selectively connecting drive and/or starter units to a load.

SUMMARY

Some embodiments provide an apparatus including a housing, a first disconnect switch in the housing and having a first terminal configured to be coupled to a first unit (e.g., a first VFD or RVSS) external to the housing and a second disconnect switch in the housing and having first terminal configured to be couple to a second unit (e.g., a second VFD or RVSS) external to the housing. The apparatus further includes a first contactor in the housing and having a first terminal coupled to a second terminal of the first disconnect switch and a second terminal configured to be coupled to a motor and a second contactor in the housing and having a first terminal coupled to a second terminal of the second disconnect switch and a second terminal configured to be coupled to the motor The second contactor is mechanically interlocked with the first contactor.

The apparatus may include a switch configured to actuate the first and second contactors such that the first contactor is closed and the second contactor is open for a first position of the switch and the first contactor is open and the second contactor is closed for a second position of the switch. The first and second contactors may be both open for a third position of the switch.

In some embodiments, the apparatus may include a control circuit in the housing, coupled to the first and second contactors and configured to indicate a status of the apparatus. The status may be a source for the motor and/or respective states of the first and second units.

In some embodiments, the control circuit may be configured to receive control power from the first and second units. The control circuit may be further configured to be coupled to respective fault indicators of the first and second units and to indicate faults of the first and second units responsive to the respective fault indicators.

Further embodiments provide a system including a first unit in first housing and comprising a first VFD or a first RVSS, and a second unit in a second housing and comprising a second VFD or a second RVSS. The system further includes a third unit in a third housing and comprising a first disconnect switch having a first terminal coupled to the first unit, a second disconnect switch having first terminal coupled to the second unit, a first contactor having a first terminal coupled to a second terminal of the first disconnect switch and a second terminal coupled to a motor, and a second contactor mechanically interlocked with the first contactor and having a first terminal coupled to a second terminal of the second disconnect switch and a second terminal coupled to the motor. The first, second and third housing may include respective motor control center (MCC) buckets.

DETAILED DESCRIPTION

Figure 1:
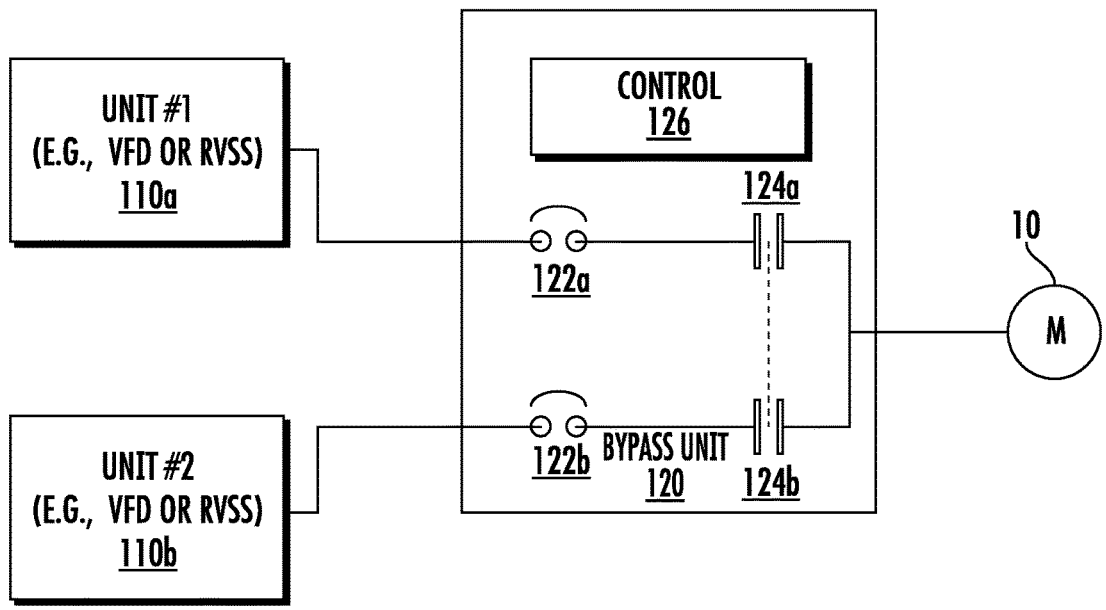
FIG. 1 is a schematic diagram illustrating a system having a bypass unit for selectively connecting VFDs, reduced voltage soft starters (RVSS) and/or other MCC units to a load according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a system according to some embodiments of the inventive subject matter. The system includes a first unit 110a, which may include, for example, an MCC component such as a VFD or a reduced voltage soft starter (RVSS). A second unit 110b includes another MCC component, such as another VFD or RVSS. The first and second units 110a, 110b are connected to a third unit 120, which is configured as a bypass unit that is operable to selectively connect the first and second units 110a, 110b to a load, such as a motor 10. The first, second and third units 110a, 110b, 120 may be configured as, for example, standard form factor MCC buckets, i.e., modular units that are designed to fit in a multi-compartment MCC.

The bypass unit 120 includes first and second disconnect switches 122a, 122b, which have first terminals that are connected to respective ones of the first and second units 110a, 110b. A second terminal of the first disconnect switch 122a is coupled to a first terminal of a first contactor 124a. A second terminal of the second disconnect switch 122b is connected to a first terminal of a second contactor 124b. Second terminals of the first and second contactors 124a, 124b are configured to be connected in common to the motor 10. The first and second contactors 124a, 124b are interlocked such that only one of the first and second contactors 124a, 124b may be closed at any given time, thus ensuring that only one of the first and second units 110a, 110b can be connected to and drive the motor 10 at any given time. The interlocking of the first and second contactors 124a, 124b may be mechanical and/or electrical. It will be appreciated that a variety of different commercially available contactors may be configured for use in such an interlocked arrangement, e.g., by using commercially available interconnect modules that mechanically and/or electrically interlock the contactors.

Figure 2:
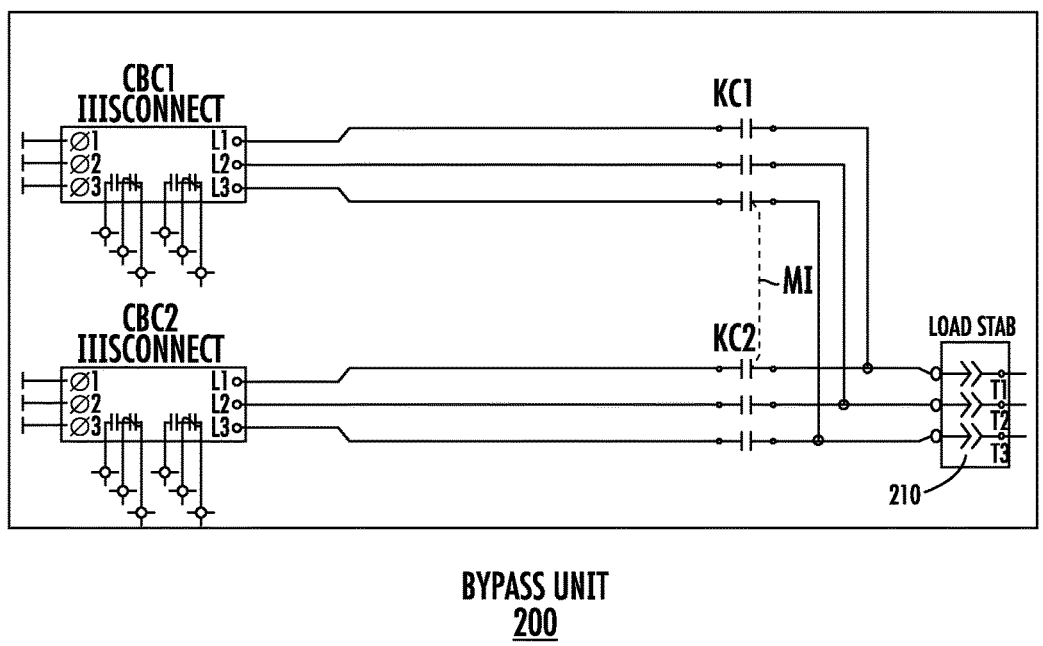
FIG. 2 is a schematic diagram illustrating a bypass unit according to some embodiments.
Figure 3:
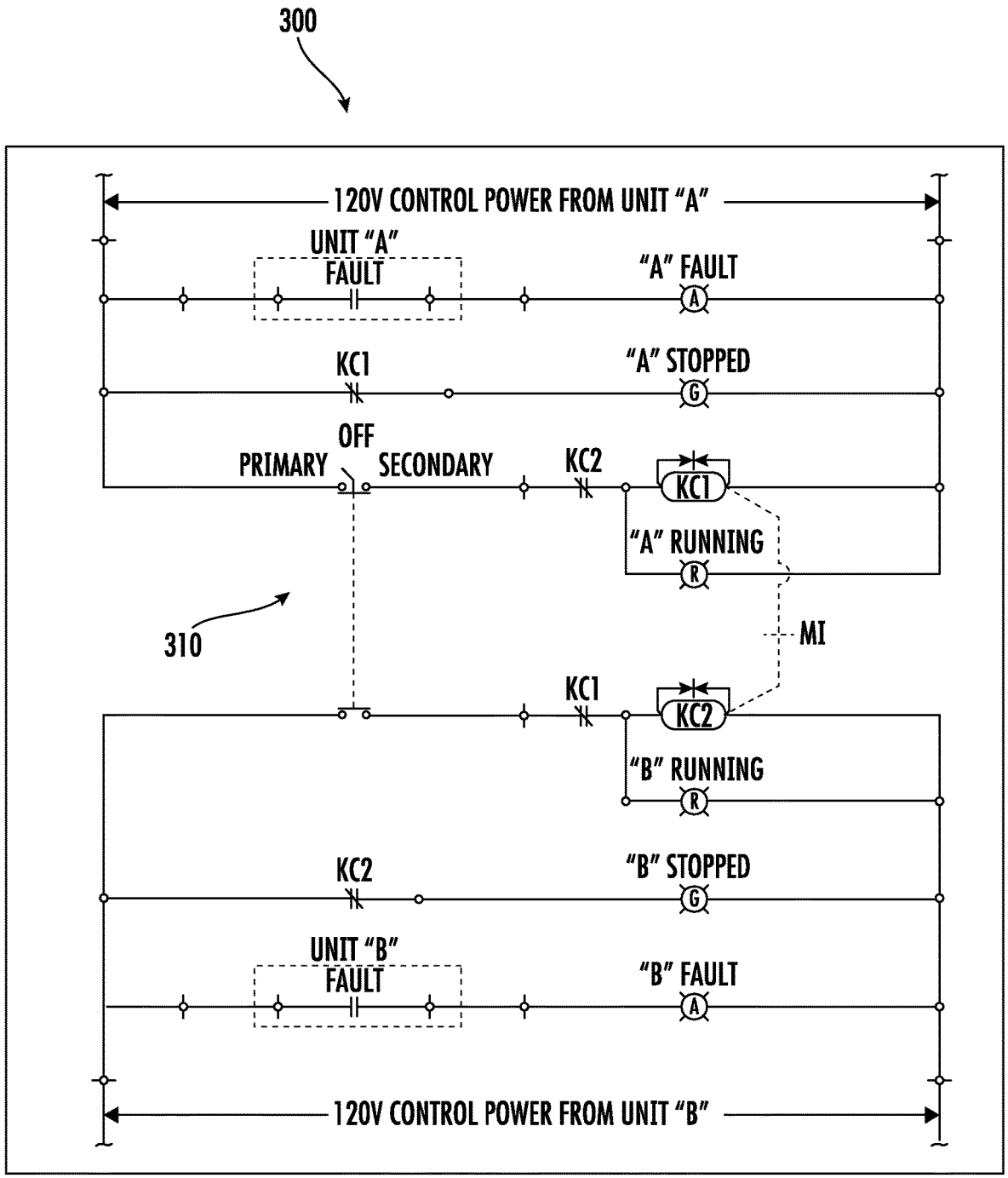
FIG. 3 is a relay logic diagram for a control circuit of a bypass circuit according to further embodiments.

FIGS. 2 and 3 illustrate an example implementation of such a bypass unit according to further embodiments. The bypass unit 200 may be configured as an MCC bucket. A first disconnect switch for a first unit "A" connected to a bypass unit 200 may be a first three-phase thermal magnetic circuit breaker CBC1. A second disconnect for a second unit "B" connected to the bypass unit 200 may be a second three-phase thermal magnetic circuit breaker CBC2. The circuit breakers CBC1, CBC2 may be manually operated, and may further include provision from remote shunt trip operation responsive to externally-applied signaling.

The first and second circuit breakers CBC1, CBC2 are connected to respective first and second mechanically interlocked contactors KC1, KC2. Outputs of the first and second contactors KC1, KC2 may be connected in common to a load stab 210 that is used to connect to an external bus (e.g., a bus of an MCC) that is connected to motor or other load.

FIG. 3 illustrates a control circuit 300 for the bypass unit 200 of FIG. 2. The control circuit 300 is configured to receive control power (e.g., 120 volts) from both of "A" and "B" units (e.g., different VFD/RVSS units) connected to the bypass unit 200. The control circuit 300 includes a selector switch 310 that is configured to allow an operator to select from among (1) connection of the load to the "A" unit, (2) connection of the load to the "B" unit, and (3) disconnection of the load from both of the "A" and "B" units. Placing the selector switch 310 in the "A" position energizes the coil of the first contactor KC1, thus connecting the load to the "A" unit. Similarly, placing the switch 310 in the "B" position energizes the coil of the second contactor KC1, thus connecting the load to the "B" unit. The mechanical interlocking of the first and second contactors KC1, KC2 prevents simultaneous closing of both of the contactors. Placing the switch 310 in the "Off" position de-energizes the coils of both of the first and second contactors KC1, KC2, thus disconnecting the load from both the "A" unit and the "B" unit.

The control circuit 300 is also connected to fault indicator relays in each of the "A" and "B" units and includes indicators (e.g., lamps, LEDs or similar devices) that indicate the status of the "A" and "B" units (e.g., whether the units have faults indicated by their respective fault indicator relays) and which of the "A" and "B" units is currently connected to and operating the load. This arrangement enables the control circuitry to operate using control power received from whichever of the "A" unit and the "B" unit is currently active, irrespective of the state of the other unit. This can allow, for example, removal of one of the units while a currently active unit continues to operate. The isolation provided by the circuit breakers CBC1, CBC2 enables such removal to be performed safely by affirmatively preventing back feed to the inactive unit.

Figure 4:
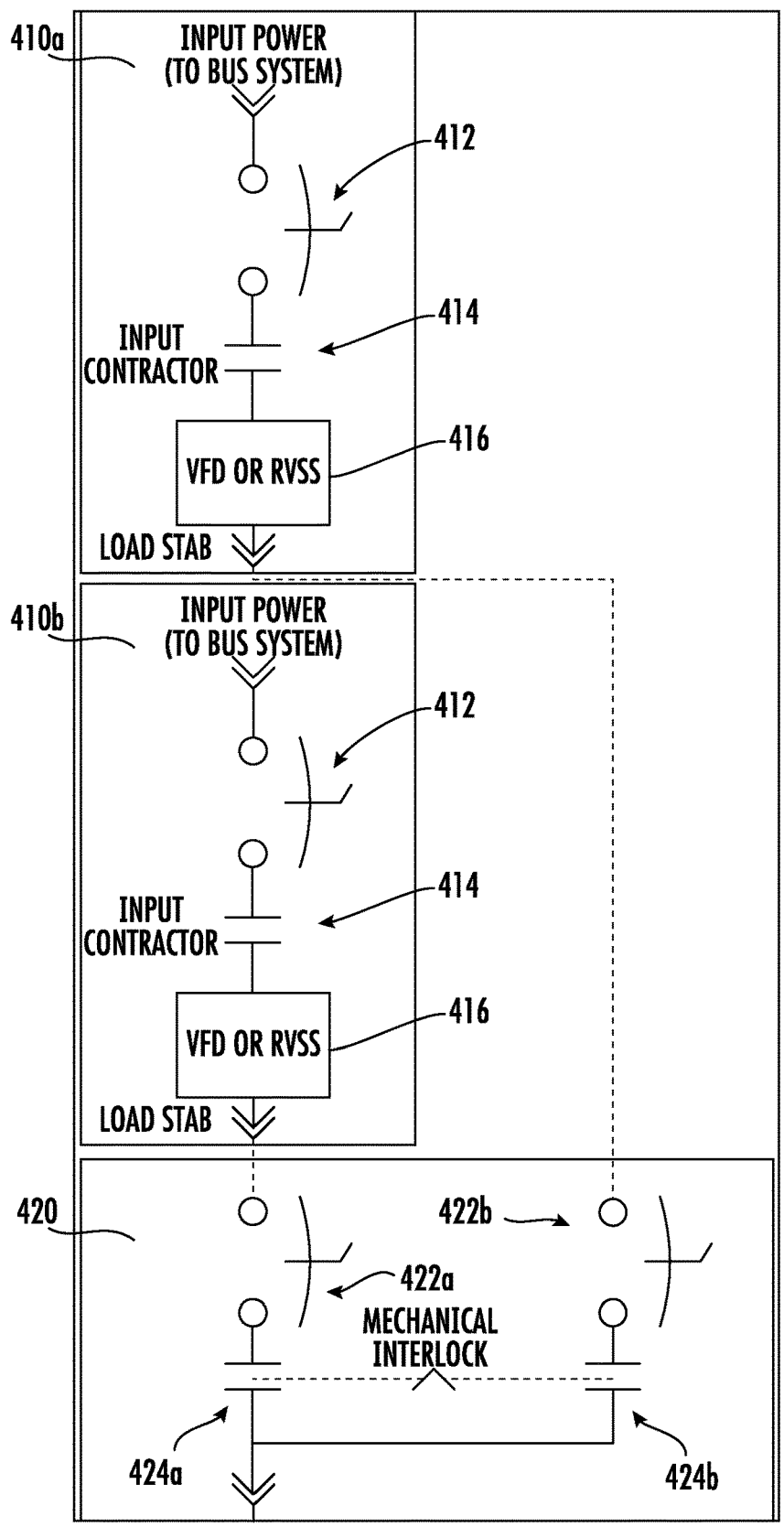
FIG. 4 is a schematic diagram illustrating an arrangement of MCC drive/starter units and a bypass unit according to some embodiments.
Figure 5:
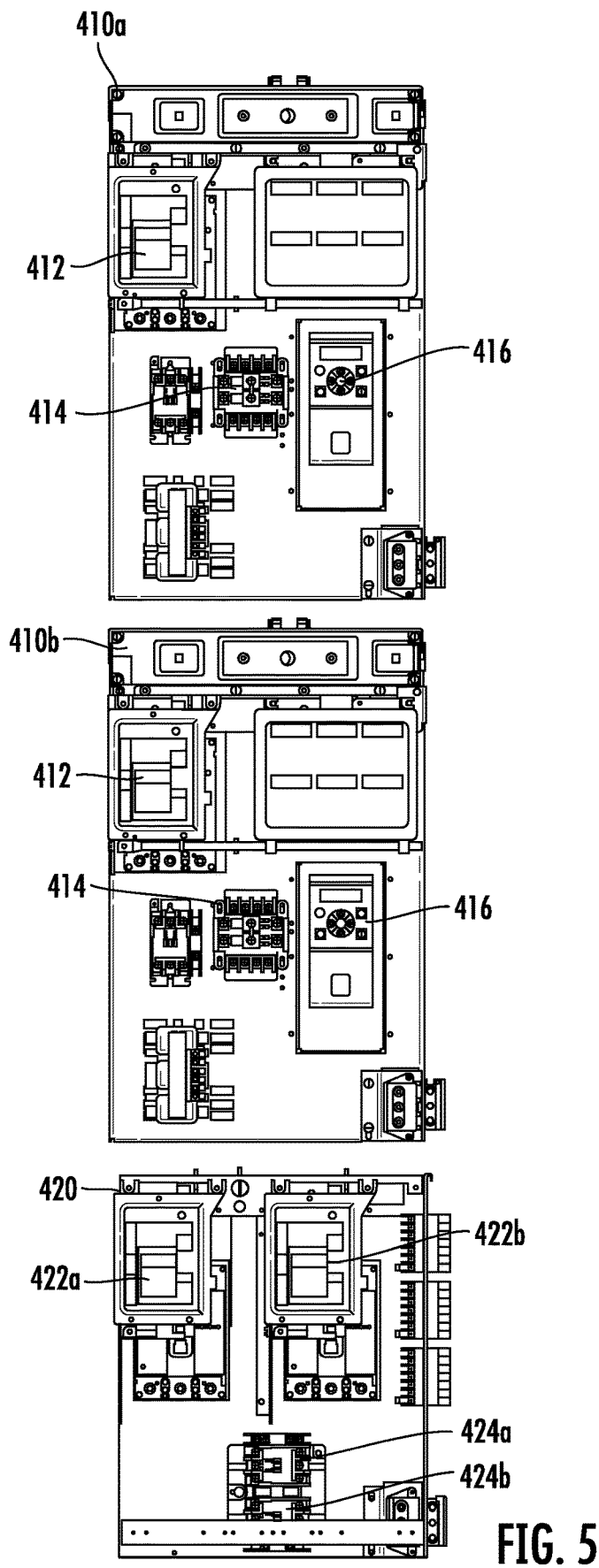
FIG. 5 is a front view of the arrangement of FIG. 4.
Figure 6:
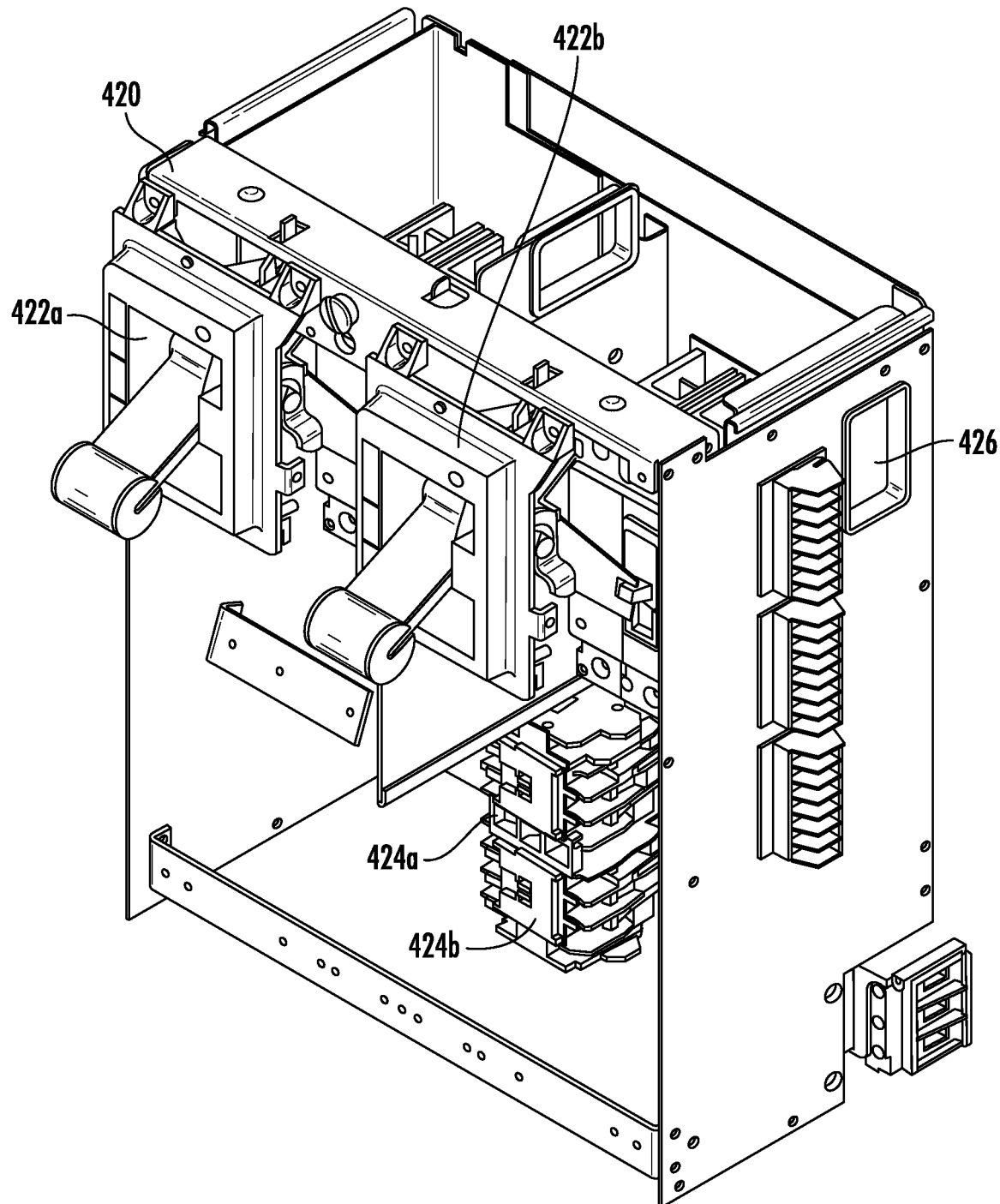
FIG. 6 is a perspective view of an MCC bypass unit according to further embodiments.

FIGS. 4-6 illustrate an example of an MCC system employing a bypass unit along the lines discussed above. The system includes first and second VFD/RVSS units 410a, 410b, each of which include input breakers 412, input contactors 414 and a VFD or RVSS module 416. The units 410a, 410b receive power from an MCC power bus system, and are coupled to a bypass unit 420 via stabs, which may be fixed or retractable. The bypass unit 420 includes first and second circuit breakers 422a, 422b that are connected to the outputs of the respective VFD/RVSS units 416 of the first and second units 410a, 410b, and to inputs of respective mechanically interlocked contactors 424a, 424b.

FIG. 6 is a perspective view of the bypass unit 420, showing the first and second circuit breakers 422a, 422b and the mechanically interlocked contactors 424a, 424b. As shown, the enclosure of the bypass unit 420 may include a cutout on its sidewall that may be used for routing of cabling.

In this specification, there have been disclosed embodiments of the inventive subject matter and, although specific terms are employed, they are used in a generic and descriptive sense only and not for purposes of limitation. The following claims are provided to ensure that the present application meets all statutory requirements as a priority application in all jurisdictions and shall not be construed as limiting the scope of the inventive subject matter.

What is claimed:

1. An apparatus comprising:
   a housing;
   a first disconnect switch in the housing and having a first terminal configured to be coupled to a first unit external to the housing;
   a second disconnect switch in the housing and having first terminal configured to be coupled to a second unit external to the housing;

a first contactor in the housing and having a first terminal coupled to a second terminal of the first disconnect switch and a second terminal configured to be coupled to a motor; and a second contactor in the housing and having a first terminal coupled to a second terminal of the second disconnect switch and a second terminal configured to be coupled to the motor, the second contactor mechanically interlocked with the first contactor.

2. The apparatus of claim 1, further comprising a switch configured to actuate the first and second contactors such that the first contactor is closed and the second contactor is open for a first position of the switch and the first contactor is open and the second contactor is closed for a second position of the switch.

3. The apparatus of claim 2, wherein the first and second contactors are both open for a third position of the switch.

4. The apparatus of claim 1, further comprising a control circuit in the housing, coupled to the first and second contactors and configured to indicate a status of the apparatus.

5. The apparatus of claim 4, wherein the status comprises an identify of a source for the motor and/or respective states of the first and second units.

6. The apparatus of claim 4, wherein the control circuit is configured to receive control power from the first and second units.

7. The apparatus of claim 6, wherein the control circuit is further configured to be coupled to respective fault indicators of the first and second units and to indicate faults of the first and second units responsive to the respective fault indicators.

8. The apparatus of claim 1, wherein the first unit comprises one of a variable frequency drive (VFD) and a reduced voltage soft starter (RVSS) and wherein the second unit comprises one a VFD and an RVSS.

9. The apparatus of claim 1, wherein the first and second disconnect switches comprise respective manually operable circuit breakers.

10. The apparatus of claim 1, further comprising a stab assembly supported by the housing and configured to couple the second terminals of the first and second contactors to the motor.

11. A system comprising:
a first unit in first housing and comprising a first VFD or a first RVSS;
a second unit in a second housing and comprising a second VFD or a second RVSS; and
a third unit in a third housing and comprising a first disconnect switch having a first terminal coupled to the first unit, a second disconnect switch having first terminal coupled to the second unit, a first contactor having a first terminal coupled to a second terminal of the first disconnect switch and a second terminal coupled to a motor, and a second contactor mechanically interlocked with the first contactor and having a first terminal coupled to a second terminal of the second disconnect switch and a second terminal coupled to the motor.

12. The system of claim 11, wherein the third unit further comprises a control circuit in the housing, coupled to the first and second contactors and configured to indicate a status of the system.

13. The system of claim 12, wherein the status comprises an identity of a source for the motor and/or respective states of the first and second units.

14. The system of claim 12, wherein the control circuit is configured to receive control power from the first and second units.

15. The system of claim 14, wherein the control circuit is coupled to respective fault indicators of the first and second units and configured to indicate faults of the first and second units responsive to the respective fault indicators.

16. The system of claim 11, wherein the first and second disconnect switches comprise respective manually operable circuit breakers.

17. The system of claim 11, wherein the first, second and third housing comprise respective motor control center (MCC) buckets.

\* \* \* \* \*